United States Patent

[11] 3,561,578

[72] Inventors Walter H. Goodwin
Sierra Madre;
Basil H. Minnich, Long Beach, Calif.
[21] Appl. No. 764,269
[22] Filed Oct. 1, 1968
[45] Patented Feb. 9, 1971
[73] Assignee McDonnell Douglas Corporation
a corporation of Maryland

[54] DECELERATING DEVICE
6 Claims, 6 Drawing Figs.
[52] U.S. Cl. .................................................. 193/32,
193/40
[51] Int. Cl. ............................................... B65g 11/20
[50] Field of Search ....................................... 193/32, 40

[56] References Cited
UNITED STATES PATENTS
2,292,753 8/1942 Gerald ......................... 193/40
2,306,955 12/1942 Karbusky ..................... 193/32
2,846,041 8/1958 Shepard ....................... 193/32
3,088,569 5/1963 McClelland et al. .......... 193/40

Primary Examiner—Andres H. Nielsen
Attorneys—Walter J. Jason, Donald L. Royer and Ming Y. Moy ABSTRACT: An article decelerating device including a rotatably supported lever, a self-releasing unit pivotally mounted to one end of the lever, and at least one hydraulic energy absorber coupled to another end of the lever. The self-releasing unit, adapted to engage a moving article, is spring-loaded and normally held in an upright position. Upon engagement of a moving article with the self-releasing unit, the inertial force of the article is transferred to the lever. The lever rotates to exert pressure upon the hydraulic energy absorber to a predetermined absorption limit, thus to reduce the speed of the moving article. When the predetermined amount of energy has been absorbed by the hydraulic energy absorber and upon movement of the lever to a release position, the remaining inertial force imparted by the moving article causes the self-releasing unit to pivot about its axis automatically to disengage the moving article, thus releasing the article for further movement at a reduced speed.

PATENTED FEB 9 1971

INVENTORS
WALTER H. GOODWIN
BASIL H. MINNICH
BY Ming Y. Moy
Attorney

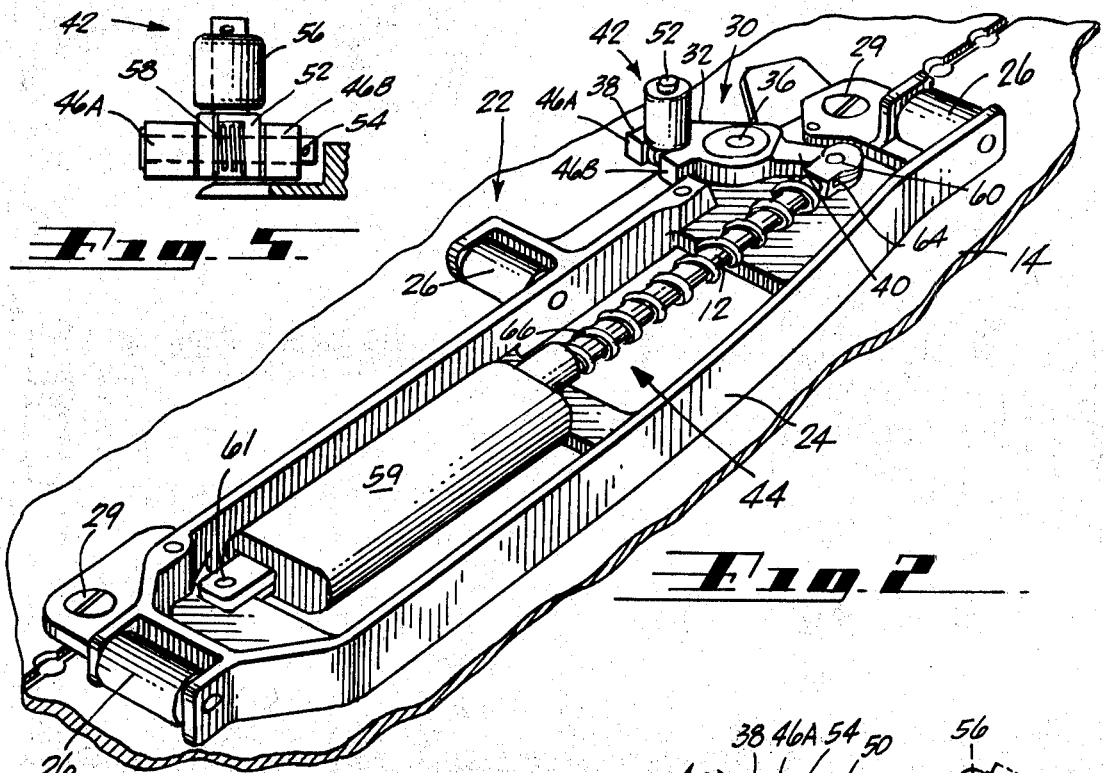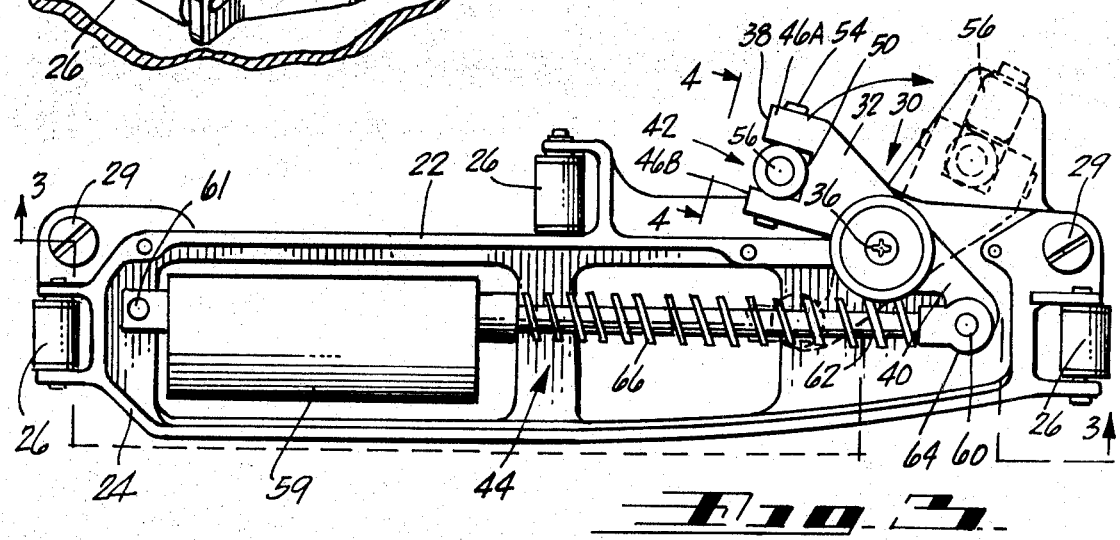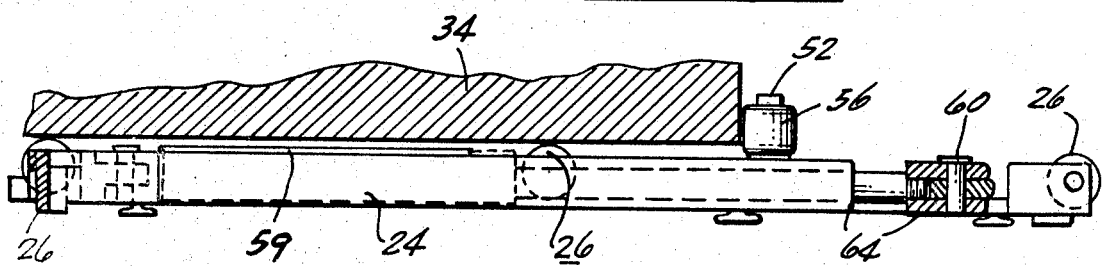

DECELERATING DEVICE

BACKGROUND OF THE INVENTION

In the field of cargo tar transportation, apparatus is normally employed to support the cargo. For this purpose, a load supporting element such as a pallet is frequently employed. Generally, a pallet is a substantially planar surface which is to be employed in a horizontal manner upon which the several objects of cargo are fixedly supported. Usually, conveyor systems including low friction rolling devices are used to move the pallet into and out of a various primary transportation means.

Common types of primary transportation means are vehicles such as trucks, railroads, ships and airplanes. This invention will be shown with respect to air craft although its use in other transportation means is quite probably probable. In aircraft that are specifically designed for cargo, there are fixed to the floor low frictional devices such as rollers or ball casters to facilitate the installation and removal of the load supporting elements.

It is not uncommon for a loaded pallet to weigh as much as 7,000 pounds. It is readily apparent that upon movement of so great a weight on roller devices, an excessive moving speed is frequently attained and maneuvering control of the cargo pallet is frequently lost, which often results in serious damage to surrounding objects as well as the cargo and the pallet itself.

In order to avoid this problem of high moving speeds, one prior solution is to provide the conveyor rollers with a builtin stopping mechanism operating on the principle of centrifugal force, which automatically, at a certain speed, stops the rotation of the roller. The roller thus controlled will then act as a brake against the movement of the pallet or cargo bottom surface; however, the braking forces are directly applied to the roller resulting in excessive stresses on the builtin stopping mechanism and wear on the roller and pallet surfaces.

Another prior solution for the above problem includes the use of friction devices to reduce the high speed of the moving pallet to within reasonable limits; however, the prior friction devices are of heavy weight, large volume, and low in efficiency. Further, the prior friction devices have no automatic self-releasing capability to allow continuous movement of the cargo pallet at a reduced speed. It is a direct improvement of the state of the art to provide a simple device for reducing high impact loads to within tolerable limits, and which incorporates an automatic self-releasing mechanism to allow continuous movement of the cargo during and after the absorbing of a predetermined amount of energy.

SUMMARY OF THE INVENTION

In carrying out the principles of this invention according to one embodiment thereof, there is provided an article decelerating device for decelerating the movement of an article a such as a cargo pallet. The decelerating device includes a lever rotatably supported on a base, a self-releasing unit adapted to engage a moving article and pivotally mounted to one end of the lever, and at least one hydraulic energy absorber coupled to another end of the lever. The self-releasing unit is spring-loaded so as to be held normally in an upright or engaged position. The lever is capable of rotating between an engaged and a released position. When a moving article, such as a cargo pallet, engages the self-releasing unit, the force exerted on the self-releasing unit by the article is transferred to the lever. The lever rotates to exert pressure on the hydraulic energy absorber which absorbs a predetermined amount of the energy and thus reduce the speed of the article. When the predetermined amount of energy has been absorbed by the hydraulic energy absorber and the lever has rotated to the released position, the force exerted on the self-releasing unit causes the latter to pivot away from the article, thus automatically releasing the article for further movement at a reduced speed. The decelerating device, in combination with a plurality of conveyor roller elements, form an efficient and safe cargo handling apparatus for use in an aircraft.

BRIEF DESCRIPTION OF THE DRAWINGS

FIG. 2 is a perspective view of a conveyor assembly which includes means for decelerating the movement of an article;

FIG. 3 is a plan view of the invention as shown in FIG. 2;

FIG. 4 is a side view of the invention as shown in FIG. 2, depicting a self-releasing unit positioned to receive a cargo pallet;

FIG. 5 is a side view of the self-releasing unit included in the invention as shown in FIG. 2.

DESCRIPTION OF THE PRESENT EMBODIMENTS

The present invention can best be represented by first describing generally the manner in which a an airplane, equipped with the apparatus of the present invention, may be utilized as a cargo carrying aircraft and then proceeding through a detailed description of the present invention.

Figure 1:
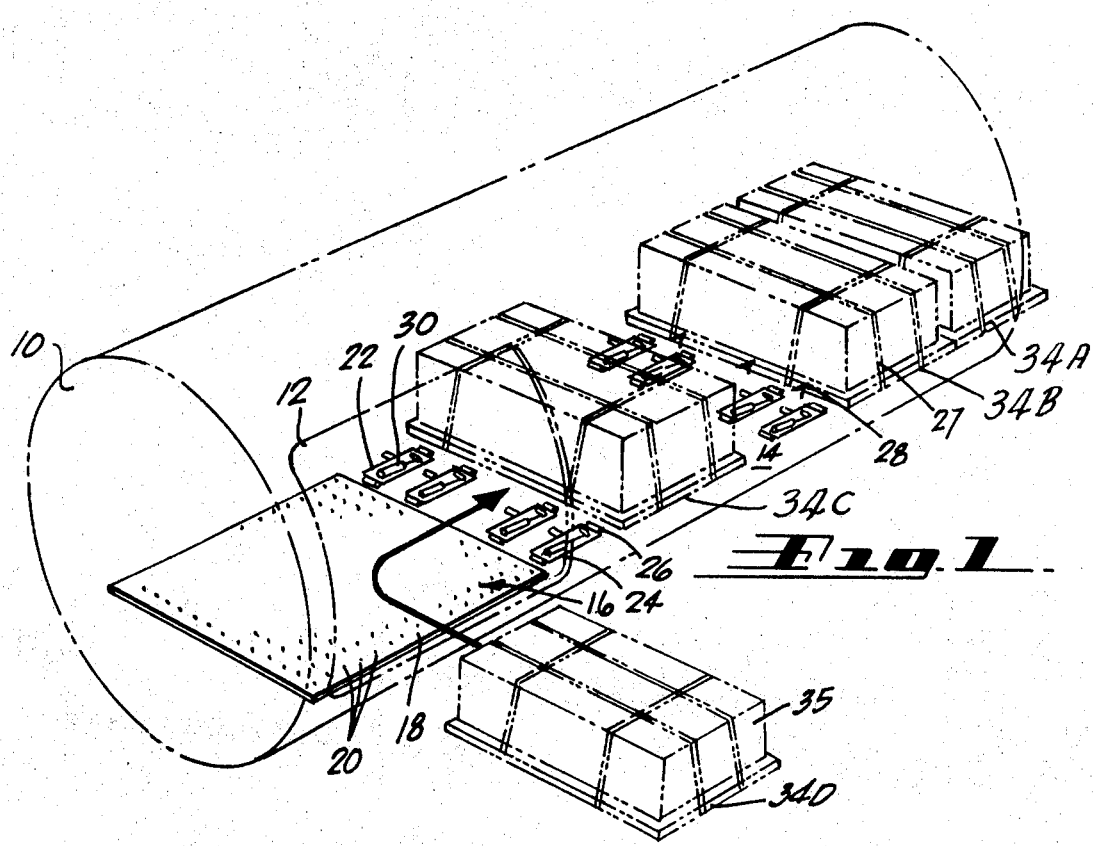
FIG. 1 is an isometric view illustrating the cargo handling apparatus of the present invention installed in the fuselage of an airplane and showing cargo pallets being moved into the airplane.

With reference to FIG. 1, an airplane fuselage 10 is provided with a side doorway 12 and a floor 14. The area of the floor adjacent the doorway 12 is provided with a ball mat 16 which comprises a base platform 18 in which are mounted a plurality of pallet supporting ball elements 20. These ball elements 20 are distributed over substantially the entire area of the base platform 18, and are mounted in such a manner that they are free to rotate about any axis so that a pallet supported by these ball elements can be moved horizontally in any direction. This ball mat 16 is or may be one of those that is presently used in the cargo conveying art.

Mounted to the floor 14 of the aircraft and extending longitudinally thereof are a plurality of cargo handling assemblies 22. Each cargo handling assembly 22 comprises a longitudinally extending base portion 24 to which is mounted along the entire length thereof at moderately spaced longitudinal intervals a plurality of conveying roller elements 26 with the conveying roller elements 26 of the cargo handling assembly 22 defining collectively a conveying plane for cargo pallets. The cargo handling assembly 22 further includes an article decelerating device or decelerating means 30 which is rotatably mounted on the base portion 24. The decelerating means 30 is employed to decelerate the movement of an article such as a cargo pallet, the detail construction and operation thereof to be discussed hereinafter.

A plurality of retractable cargo pallet restraint devices 28 are secured to the floor 14 of the aircraft, and are spaced longitudinally and located at positions corresponding to the location at which the rear edge of one cargo pallet is adjacent to the front edge of a proximate cargo pallet. These cargo pallet restraints 28 are ordinarily in a retracted position and are raised only when a related cargo pallet is in place with the restraint device 28 then being brought up into its pallet restraint position. The pallet restraint device 28 is of ordinary construction well known in the cargo conveying art.

In FIG. 1 there are shown four cargo pallets (these having the general designation 34), each of which has a cargo load 35 secured thereto by securing means 27. The first two cargo pallets 34A and 34B are shown having been moved into the aircraft and secured in their proper locations by cargo pallet restraints 28. A third cargo pallet 34C is in a position to be moved rearwardly over the cargo handling assemblies 22 to a location where the rear edge portion thereof may be moved into restraining engagement with the pallet restraints 28 which engage the front edge portion of the second cargo pallet 34B. As the third cargo pallet 34C reaches its desired location, the next forward set of pallet restraints 28 are raised to engage the front edge of this third cargo pallet 34C. A fourth cargo pallet 34D is shown as in position to be moved into the airplane.

In FIGS. 2 through 5, there is shown a cargo handling assembly 22 which includes the base portion 24 having mounted thereon a plurality of conveying roller elements 26 and the article decelerating device 30. The base 24 is fixedly secured to the aircraft floor 14 by fastening means 29.

The article decelerating device 30, employed to decelerate the movement of an article, such as the cargo pallet 34, includes a lever 32 which is rotatably supported on the base portion 24 by a pin 36. The lever or body 32 rotates with respect to the base portion 24 about the pin 36 establishing a first axis of rotation. The lever 32 is capable of rotating between an engaged position and a released position as shown by the dotted lines in FIG. 3. The lever 32 includes two end portions 38 and 40. The end portion 38 is bifurcated with furcations 46A and 46B extending on either side of an engaging surface 50. The end portion 38 has a self-releasing unit 42 pivotally connected thereto while the end portion 40 having operatively coupled thereto energy absorbing means 44.

The self-releasing unit 42 includes a release pin 52 which is pivotally supported between the furcations 46A and 46B and abutting the engaging surface 50 by a pivot pin 54. The release pin 52 pivots about the pivot pin 54 with its pivotal movement being limited by the engaging surface 50 of the lever 32. The pivot axis of the release pin 52 forms a right angle with the rotation axis of the lever 32. The self-releasing unit 42 further includes a roller 56 and a spring 58. The roller 56, adapted to engage a moving article such as the cargo pallet 34, is rotatably supported by the release pin 52. The roller 56 rotates about the release pin 52, establishing a plane of rotation that is parallel to the plane of rotation of the lever 32. The spring 58, having one end secured to the lever 32 and its other end connected to the release pin 52, supports the roller 56 and the release pin 52 in an upright or engaged position.

The energy absorbing means 44 includes at least one hydraulic energy absorber 59 which is pivotally connected to the lever 32 by a pivot pin 60 through a piston rod 62 and a coupler 64. The hydraulic energy absorber 59 is further secured to the base 24 by fastening means 61. A return spring 66, included in the hydraulic energy absorber, is provided for returning the lever 32 to the engaged position from the released position. The hydraulic energy absorber 59, specific details of which are not part of this invention, may be a conventional one, such as a Model S energy absorber available from the Hanna Company of Chicago, Illinois.

As stated above, the self-releasing unit 42, which comprises the release pin 52 and the roller 56, is normally held in an upright or engaged position by the spring 58. Operationally, when a moving article, such as the cargo pallet 34, engages the roller 56, the force being exerted on the roller 56 by the pallet 34 is transferred to the release pin 52. The release pin 52, in turn, transfers the force of the pallet 34 to the lever 32 through the engaging surface 50. The lever 32 rotates to exert pressure on the hydraulic energy absorber 59 which absorbs a predetermined amount of energy and reduces the speed of the pallet 34. When the lever 32 has rotated to the released position, and a predetermined amount of energy has been absorbed by the hydraulic energy absorber 59, the moving pallet 34 causes the self-releasing unit 42 to pivot from the upright or engaged position to a released position as shown by the dotted lines in FIG. 3, thus automatically releasing the pallet 34 for further movement at a reduced speed. After releasing the cargo pallet 34, the lever 32 is returned to its original engaged position by the return spring 66 of the hydraulic energy absorber 59. The roller 56 and the release pin 52 are also returned to their upright or engaged position by the return spring 58.

Figure 6:
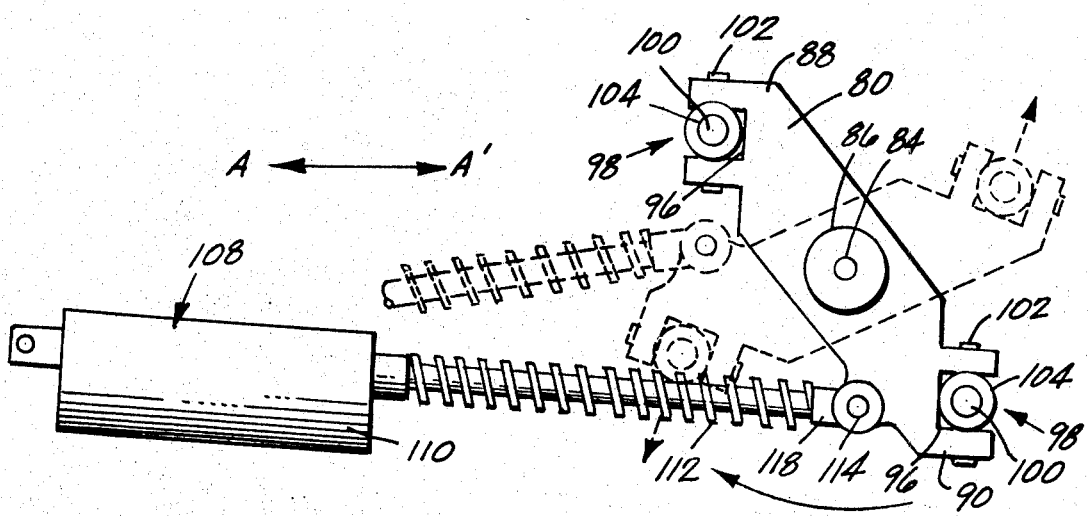
FIG. 6 is a plan view of a bidirectional article decelerating device.

Shown in FIG. 6 is a bidirectional article decelerating device 70 which can be employed in place of the article decelerating device 30 in the cargo handling assembly 22. The decelerator 70 includes a lever or body 80 which is rotatably supported on a base (not shown) by a pin 84 and fastening means 86. The lever 80 is capable of rotating between an engaged position and a released position as shown by the dotted lines in FIG. 6. The lever 80 has two end portions 88 and 90, each end portion being bifurcated with one furcation thereof extending on either side of an engaging surface 96. A self-releasing unit 98 is pivotally mounted intermediate the furcations and abutting the engaging surface 96 at each of the end portions 88 and 90.

The self-releasing unit 98, the construction and operation is identical to the self-releasing unit 42 shown in FIGS. 2 through 5, includes a release pin 100 which is pivotally mounted intermediate the furcations and abutting the engaging surface 96 at each of the end portions 88 and 90 by pivot pins 102. The self-releasing unit 98 further includes a roller 104 and a return spring (not shown). The roller 104, adapted to engage the cargo pallet 34, is rotatably supported on the release pin 100. The pivotal movement of the release pin 100 is limited by the engaging surface 96 of the lever 80. The return spring, connecting the lever 80 and the release pin 100, supports the pin 100 and the roller 104 in an upright or engaged position.

The lever 80 has operatively coupled thereto energy absorbing means 108 which includes at least one hydraulic energy absorber 110. The hydraulic energy absorber 110 includes a spring means 112 for returning the lever to the engaged position from the released position as shown by the dotted lines in FIG. 6. The hydraulic energy absorber 110 is coupled to the body 80 by a pin 114 and a coupler 118.

Operationally, when the cargo pallet 34 is moved in the A¹ direction, shown by an action arrow A–A¹, it engages and exerts a force on the rollers 104 of the self-releasing units 98. The roller 104, which is mounted on the end portion 88, transfers the force exerted thereto to the lever 80 through the release pin 100 and the engaging surface 96. The lever 80 rotates to exert pressure on the hydraulic energy absorber 110 which absorbs a predetermined amount of energy and reduces the speed of the pallet 34. If contact is made between the pallet 34 and the self-releasing unit 98 which is pivotally supported on the end portion 90, the same self-releasing unit pivots away from and releases the pallet for further movement.

When the predetermined amount of energy has been absorbed by the absorber 110, and the lever 80 has rotated to the released position, the moving pallet 34 causes the release pin 100 to pivot its axis from an engaged position to a released position as shown by the dotted lines in FIG. 6, thus automatically releasing the pallet 34 for further movement at a reduced speed. After releasing the moving pallet 34, the lever 80, the rollers 104 and the release pins are returned to their engaged positions.

When the cargo pallet 34 is moved in the A direction, shown by the action arrow A–A¹, the roller 104, which is supported on the end portion 90, transfers the force to the energy absorber 110, similar to the operation described above. Thus, the decelerator 70 has the advantage of being capable of decelerating articles moving in either direction without relocation of the decelerator itself.

We claim:
1. An article decelerating device comprising:
 a base;
 a lever rotatably supported on said base, said lever, capable of rotating between an engaged and a released position, includes a first and a second end portion, said second end portion being bifurcated with one furcation thereof extending on either side of an engaging surface;
 at least one hydraulic energy absorber operatively coupled to said first end portion, said absorber includes a spring means capable of returning said lever to the engaged position from the released position when a predetermined amount of energy has been absorbed by said energy absorber;
 a release pin pivotally mounted intermediate said furcations and abutting said engaging surface, the pivotal movement of said release pin being limited by said engaging surface and the pivot axis of said release pin forming a right angle with the axis of rotation of said lever; and
 a roller adapted to engage the moving article and rotatably supported on said release pin, the plane of rotation of said roller is parallel to the plane of rotation of said lever, said roller, upon engagement with the moving article, being capable of transferring energy of the moving article to said lever through said release pin and said engaging surface, said lever being capable of transferring energy to said energy absorber by rotating from the engaged position toward the released position, said release pin being pivotable from an engaged position to a released position to disengage said roller from said article when said lever has rotated to a release position and the predetermined amount of energy has been absorbed by said hydraulic energy absorber.

2. The article decelerating device according to claim 1 and further including returning means for returning said release pin from the released position to the engaged position after the disengagement of said roller from the moving article, said returning means includes a spring having two end portions, one end being connected to said release pin and the other end being connected to said body.

3. A bidirectional article decelerating device comprising:
a base;
a lever rotatably supported on said base, said lever, capable of rotating between an engaged and a released position, includes two bifurcated end portions with one furcation thereof extending on either side of an engaging surface at each end portion;
energy absorbing means operatively coupled to said lever for absorbing a predetermined amount of energy; and
a self-releasing unit pivotally mounted intermediate said furcations and abutting said engaging surface at each of said end portions, the pivotal movement of said self-release unit being limited by said engaging surface and the pivot axis of said self-releasing unit forming a right angle with the axis or of rotation of said lever, said self-releasing unit being adapted to engage a moving article and upon engagement with the article, said self-releasing unit being capable of transferring energy of the article to said lever through said engaging surface, said lever being capable of transferring energy to said energy absorbing means by rotating from the engaged position toward the released position, said self-releasing unit being pivotable from an engaged position to a released position to disengage the article when said lever has rotated to the released position and said energy absorbing means has absorbed a predetermined amount of energy.

4. The apparatus of claim 3 wherein said energy absorbing means includes at least one hydraulic energy absorber operatively coupled to said lever, said absorber includes means for returning said lever to the engaged position from the released position.

5. The apparatus of claim 4 wherein said self-releasing unit comprises:
a release pin pivotally mounted intermediate said furcations and abutting said engaging surface at each of said end portions;
a roller adapted to engage the moving article and rotatably supported on said release pin, the plane of rotation of said roller being parallel to the plane of rotation of said body, said roller, upon engagement with the moving article, being capable of transferring energy of the moving article to said energy absorbing means through said release pin and said body, said release pin being pivotable from an engaged position to a released position to disengage said roller from the article when said lever has rotated to a released position and said energy absorbing means has absorbed the predetermined amount of energy; and
returning means for returning said release pin from the released position to the engaged position after disengagement of said roller from the moving article, said returning means includes a spring having two end portions, one end being connected to said release pin and the other end being connected to said lever.

6. An article deceleration device comprising:
a base:
a body, rotatably supported on said base and adapted to engage a moving article and upon engagement with the moving article said body being rotated from an engage position toward a release position;
means operatively connected to said body to return said body to the engage position from the release position;
energy absorbing means operatively coupled to said body for absorbing energy upon engagement of the moving article with said body, said body rotatably moving to a release position to disengage the moving article when the energy has been absorbed by said energy absorbing means; and
self-releasing means pivotally supported on said body and adapted to engage the moving article, said self-releasing means, upon engagement with said moving article, being capable of transferring energy of the moving article to said energy absorbing means through said body, said self-releasing means being pivotable from an engage position to a release position to disengage the moving article when energy has been absorbed by said energy absorbing means and said body has rotated to the release position, said self-releasing means including a release pin pivotally supported on said body, a roller adapted to engage the moving article and rotatably supported on said release pin, the plane of rotation of said roller being generally parallel to the plane of rotation of said body, said roller upon engagement with the moving article being capable of transferring energy of the moving article to said energy absorbing means through said release pin and said body, and means for returning said release pin from the release position to the engage position after disengagement of said roller from the moving article, said returning means including resilient means connected between said release pin and said body.